United States Patent
Crews et al.

(10) Patent No.: US 6,194,471 B1
(45) Date of Patent: Feb. 27, 2001

(54) FLUID CONCENTRATES OF MODIFIED MINERAL ACID SALTS

(76) Inventors: Everett Crews, 1191 Fort Lamar Rd., Charleston, SC (US) 29412; Peter Schilling, 23 Huguenot Ave., Charleston, SC (US) 29407

( * ) Notice: Subject to any disclaimer, the term of this patent is extended or adjusted under 35 U.S.C. 154(b) by 0 days.

(21) Appl. No.: 09/393,549

(22) Filed: Sep. 10, 1999

Related U.S. Application Data

(63) Continuation-in-part of application No. 09/039,173, filed on Mar. 13, 1998, now abandoned.

(51) Int. Cl.[7] ............................. B01F 3/12; C09D 195/00
(52) U.S. Cl. ...................... 516/31; 106/284.06; 252/193; 516/43; 516/914
(58) Field of Search .................. 516/43, 914, 31; 548/347.1; 510/433; 252/193; 106/284.06

(56) References Cited

U.S. PATENT DOCUMENTS

| | | | |
|---|---|---|---|
| 2,215,863 | 9/1940 | Waldmann et al. | 548/347.1 |
| 2,426,220 | 8/1947 | Johnson | 106/123 |
| 2,781,352 | 2/1957 | De Groote et al. | 548/347.1 |
| 3,097,179 | 7/1963 | Ceintrey | 516/43 X |
| 3,230,104 | 1/1966 | Falkenberg et al. | 106/277 |
| 3,868,263 | 2/1975 | McConnaughay | 106/281 |
| 3,975,295 | 8/1976 | Koch | 516/43 |
| 4,464,286 | 8/1984 | Schilling | 106/277 X |
| 4,597,799 | 7/1986 | Schilling | 106/277 |
| 5,164,121 | 11/1992 | Smith et al. | 510/493 X |
| 5,214,155 | 5/1993 | Hollingsworth et al. | 548/348.1 |
| 5,750,748 | 5/1998 | Boutique et al. | 554/66 |

OTHER PUBLICATIONS

Kirk–Othmer *Encyclopedia of Chemical Technology*, 3rd Edition, vol. 2, pp. 520–521 (1978).

*Primary Examiner*—Richard D. Lovering
(74) *Attorney, Agent, or Firm*—Daniel B. Reece, IV; Terry B. McDaniel; Richard L. Schmalz

(57) ABSTRACT

This invention relates to the production of mineral acid salts of amines which can be easily handled and pumped in plant and laboratory environments. More particularly, this invention relates to the production of water-free fluid ionic mineral acid salt compositions of fatty acid amine derivatives which are suitable for use as anti-stripping agents in hot asphalt applications.

12 Claims, No Drawings

FLUID CONCENTRATES OF MODIFIED MINERAL ACID SALTS

This application is a continuation-in-part of our commonly assigned, U.S. patent application Ser. No. 09/039,173, filed Mar. 13, 1998, now abandoned, entitled "Fluid Concentrates of Mineral Acid Salts of Amines".

FIELD OF INVENTION

This invention relates to the production of mineral acid salts of amines which can be easily handled and pumped in plant and laboratory environments. More particularly, this invention relates to the production of water-free fluid ionic mineral acid salt compositions of fatty acid amine derivatives which are suitable for use as anti-stripping agents in hot asphalt applications.

BACKGROUND OF THE INVENTION

Asphalts and mineral aggregates constitute the principal materials of construction for asphalt pavements. Asphalts (complex mixtures of nonpolar bituminous hydrocarbons derived from petroleum refining) exhibit a low affinity for water. In contrast, the surfaces of mineral aggregates are typically polar and highly-charged, thereby imparting a high affinity for water. These pronounced differences in polarity and water affinities result in the mineral surfaces of aggregates and asphalts displaying very low affinities for one another. Accordingly, asphalts often adhere poorly or not at all to the surfaces of mineral aggregates.

A consequence of poor adhesion is a short service life for asphalt pavement. The debonding of poorly adhered asphalt from aggregate is accelerated by the presence of water, which preferentially wets the aggregate (thereby causing the asphalt to strip-off the aggregate surface). The result of asphalt stripping from the aggregate surface is a flaked pavement and the formation of potholes.

Surface active amines are frequently added to asphalt formulations to reduce the water-induced debonding of asphalt from the surface of mineral aggregate. These surface active amines have polar head-groups that exhibit an affinity for polar surfaces like that of the aggregate. The surface active amines also typically contain long, non-polar fatty chains that exhibit a high affinity for asphalt. The molecular structure of the surface active amine serves to lower the interfacial tension between asphalt and aggregate, thereby increasing the strength of the adhesive bond between the two. As these surface active amines function to prevent the asphalt from stripping from the surface of the mineral aggregate, they are commonly known in the industry as anti-stripping agents.

Asphalt formulators have found that reacting these surface active amines with acids to form salt derivatives yielded increased adhesion between the asphalt and aggregate. For example, the use of carboxylic acids to neutralize certain fatty amine derivatives for use as anti-stripping agents is taught in U.S. Pat. No. 2,426,220 to Johnson. Falkenberg et al. teach the use of amidoamine salts of carboxylic acids in U.S. Pat. No. 3,230,104. The use of certain reaction products of amines and imidazolines with mineral acids as anti-stripping agents are taught in U.S. Pat. No. 3,868,263 to McConnaughay.

In addition to being utilized as anti-stripping agents, various amine salt derivatives are also commonly employed in mineral processing, ore flotation, and for metal corrosion inhibition.

However, a major problem exists with the utilization of these amine salt derivatives, particularly in plant environments. As fluidity at low temperatures is necessary for easy handling and pumping, it is required that these derivatives be liquids at temperatures below about 60° C. Unfortunately, the mineral acid salts of fatty amines, fatty amidoamines, and other similar amine derivatives of fatty acids tend to be extremely viscous, often non-flowing, paste-like materials. Moreover, water or low-boiling solvents cannot be employed to fluidize these salts for use as anti-stripping agents in hot asphalt formulations, as the volatilization of the water or solvent causes the asphalt to both foam and cool (thereby producing handling and application problems).

The physical properties of these materials result from a number of factors. First, the materials have elevated melting points and highly-ordered salt structures. The formation of an ionic bond is conducive to crystallization and a concomitant rise in melting point and viscosity; while the micellular organization of components of like polarity result in the formation of ordered molecular structures. Furthermore, non-polar fatty chains preferentially associate with other fatty chains due to van der Waals attractions. Finally, the dielectric effects and ionic interactions compel polar ammonium salt moieties to associate with one another.

The problems associated with handling these paste-like materials has traditionally been addressed in one of two ways. One method has been to heat the mineral acid salts of amine derivatives until they are sufficiently liquified to handle effectively. However, this heating causes dissociation and the liberation of both free mineral acid and free starting amine—thereby reducing the chemical effectiveness of the salt composition. The other method commonly employed to address this handling problem in production plants has been to equip the plant with costly specialized equipment for pumping viscous pastes.

Therefore, an object of this invention is to solve these problems by disclosing water-free fluid mineral acid salts of fatty acid amine derivatives.

A further object of this invention is to disclose water-free fluid mineral acid salt compositions of fatty acid amine derivatives which are suitable for use as anti-stripping agents in hot asphalt formulations.

SUMMARY OF INVENTION

The objects of this invention are met by producing water-free ionic mineral acid salt compositions of fatty acid amine derivatives wherein the ordered structure of the salt is disrupted, thereby affording poorly ordered compositions which are fluid at temperatures above about 25° C. Suitable salt compositions are produced by blending a fatty acid amine derivative with a mineral acid (or a mineral acid amine salt) in the presence of a polar organic solvent and, where desired, a second fatty acid amine derivative. When incorporated into asphalt formulations, these salt compositions have proven to be effective anti-stripping agents which increase adhesion between asphalt and aggregate.

DESCRIPTION OF THE PREFERRED EMBODIMENT

The fluid mineral acid salts of fatty acid amine derivatives are the neutralization reaction products which result from blending a fatty acid amine derivative with either a mineral acid or a mineral acid amine salt in the presence of a polar organic solvent and, optionally, a second fatty acid amine derivative. When a second fatty acid amine derivative is incorporated into the blend, the second fatty acid amine derivative must have a different chemical structure than the fatty acid amine derivative originally added to the blend.

The use of a polar organic solvent helps prevent the formation of a network of ordered structures, thereby increasing the fluidity of the resulting mineral acid salt composition. Likewise, the presence of a second fatty acid amine derivative having a chemical structure different to that of the fatty acid amine derivative originally added to the blend functions to disrupt the organization of fatty chains. This organizational disruption serves to further increase the fluidity of the resulting salt composition at a given temperature.

Water-free fluid mineral acid salt compositions of fatty acid amine derivatives which are suitable for use in hot asphalt applications are blends of:
 a) about 25% to about 95% by total weight of the blend of a fatty acid amine derivative selected from the group consisting of amidoamines, imidazolines, polyamidoamines, amidoamine/imidoamines, polyimidazolines, and combinations thereof;
 b) about 4% to about 35% by total weight of the blend of a mineral acid, wherein said mineral acid is added to the blend at temperature and pressure adequate to eliminate water from the blend;
 c) about 1% to about 70% by total weight of the blend of a polar organic solvent having a boiling point higher than about 160° C., wherein said polar organic solvent is selected from the group consisting of polyalkanols, polyalkanolamines, polyalkanol ethers, polyalkanol esters, and combinations thereof; and
 d) up to about 70% by weight of the blend of a second fatty acid amine derivative having a different chemical structure than the fatty acid amine derivative (a), wherein said second fatty acid amine derivative is a member selected from the group consisting of fatty polypropylene polyamines, fatty ethoxylated polypropylene polyamines, fatty amidoamines, fatty imidazolines, fatty polyamidoamines, fatty amidoamine/imidoamines, fatty polyimidazolines, and combinations thereof.

Preferred water-free fluid mineral acid salt compositions of fatty acid amine derivatives which are suitable for use in hot asphalt applications are produced by blending:
 a) about 30% to about 90% by total weight of the blend of a fatty acid amine derivative selected from the group consisting of amidoamines, imidazolines, polyamidoamines, amidoamine/imidoamines, polyimidazolines, and combinations thereof;
 b) about 9% to about 35% by total weight of the blend of a mineral acid, wherein said mineral acid is added to the blend at temperature and pressure adequate to eliminate water from the blend;
 c) about 1% to about 60% by total weight of the blend of a polar organic solvent having a boiling point higher than about 160° C., wherein said polar organic solvent is selected from the group consisting of polyalkanols, polyalkanolamines, polyalkanol ethers, polyalkanol esters, and combinations thereof; and
 d) about 1% to about 60% by weight of the blend of a second fatty acid amine derivative having a different chemical structure than the fatty acid amine derivative (a), wherein said second fatty acid amine derivative is a member selected from the group consisting of fatty polypropylene polyamines, fatty ethoxylated polypropylene polyamines, fatty amidoamines, fatty imidazolines, fatty polyamidoamines, fatty amidoamine/imidoamines, fatty polyimidazolines, and combinations thereof.

The salt-forming neutralization reaction may be produced in one of two ways. At elevated temperatures, the liquid fatty acid amine derivative may be added to, or treated with, aqueous and/or gaseous mineral acid. Water-free fluid mineral acid salts of fatty acid amine derivatives may also be obtained via a proton exchange reaction, wherein the liquid fatty acid amine derivative is reacted with a mineral acid amine salt at an elevated temperature (followed by nitrogen sparging or vacuum stripping of the volatile amine) to yield the desired salt composition.

Accordingly, additional water-free fluid mineral acid salt compositions of fatty acid amine derivatives which are suitable for use in hot asphalt applications are blends of:
 a) about 25% to about 95% by total weight of the blend of a fatty acid amine derivative selected from the group consisting of amidoamines, imidazolines, polyamidoamines, amidoamine/imidoamines, polyimidazolines, and combinations thereof;
 b) about 4% to about 45% by total weight of the blend of a mineral acid amine salt derived from a low-boiling fugitive amine, wherein said mineral acid amine salt is added to the blend at temperature and pressure adequate to eliminate the fugitive amine from the blend;
 c) about 1% to about 70% by total weight of the blend of a polar organic solvent having a boiling point higher than about 160° C., wherein said polar organic solvent is selected from the group consisting of polyalkanols, polyalkanolamines, polyalkanol ethers, polyalkanol esters, and combinations thereof; and
 d) up to about 70% by weight of the blend of a second fatty acid amine derivative having a different chemical structure than the fatty acid amine derivative (a), wherein said second fatty acid amine derivative is a member selected from the group consisting of fatty polypropylene polyamines, fatty ethoxylated polypropylene polyamines, fatty amidoamines, fatty imidazolines, fatty polyamidoamines, fatty amidoamine/imidoamines, fatty polyimidazolines, and combinations thereof.

Preferred water-free fluid mineral acid salt compositions of fatty acid amine derivatives which are suitable for use in hot asphalt applications are produced by blending:
 a) about 30% to about 90% by total weight of the blend of a fatty acid amine derivative selected from the group consisting of amidoamines, imidazolines, polyamidoamines, amidoamine/imidoamines, polyimidazolines, and combinations thereof;
 b) about 9% to about 40% by total weight of the blend of a mineral acid amine salt derived from a low-boiling fugitive amine, wherein said mineral acid amine salt is added to the blend at temperature and pressure adequate to eliminate the fugitive amine from the blend;
 c) about 1% to about 60% by total weight of the blend of a polar organic solvent having a boiling point higher than about 160° C., wherein said polar organic solvent is selected from the group consisting of polyalkanols, polyalkanolamines, polyalkanol ethers, polyalkanol esters, and combinations thereof; and
 d) about 1% to about 60% by weight of the blend of a second fatty acid amine derivative having a different chemical structure than the fatty acid amine derivative (a), wherein said second fatty acid amine derivative is a member selected from the group consisting of fatty polypropylene polyamines, fatty ethoxylated polypropylene polyamines, fatty amidoamines, fatty imidazolines, fatty polyamidoamines, fatty amidoamine/imidoamines, fatty polyimidazolines, and combinations thereof.

Sources of fatty acids which can be employed to produce fatty acid amine derivatives suitable for use in formulating the salt compositions include various animal fats and vegetable oils, glycerides, tall oil fatty acids, petroleum derived fatty acids, and the like. The term "tall oil fatty acid" refers generally to the class of products containing 90% or more fatty acids which are obtained by fractionation of crude tall oil. Such fatty acids are primarily a combination of oleic and linoleic acids, with small amounts of saturated and other unsaturated fatty acids. Common impurities include rosin and neutral materials.

Fatty acids which are suitable for use in producing the fatty acid amine derivatives utilized to formulate the salt compositions include, but are not limited to, the following: unsaturated fatty acids, saturated fatty acids, dimerized fatty acids, modified fatty acids, and combinations thereof. Suitable unsaturated and saturated fatty acids have a number average molecular weight in the range of about 190 to about 600. Suitable modified fatty acids include the Diels-Alder cyclo-adducts and the ene-addition reaction products of unsaturated and polyunsaturated fatty acids with acrylic acid, acrylic acid derivatives, fumaric acid, and/or maleic anhydride. All suitable fatty acids have a chain length of at least 12 carbons.

Fatty acid amine derivatives which are suitable for use in formulating the salt compositions are produced by reacting an applicable fatty acid in a condensation reaction with polyethylene polyamines, polypropylene polyamines, polybutylene polyamines and higher homologs, and the like.

The mineral acid salts of the various fatty acid amine derivatives suitable for use in formulating the salt compositions are the products of full or partial neutralization with mineral acids.

Mineral acids which are suitable for use in formulating the salt compositions include, but are not limited to, the following: hydrofluoric acid, hydrochloric acid, hydrobromic acid, hydroiodic acid, sulfuric acid, phosphoric acid, and combinations thereof. Both aqueous mineral acids and gaseous mineral acids may be employed.

Mineral acid amine salts employed in the production of the salt compositions are derived from low-boiling fugitive amines. As used herein, the term "fugitive amine" means amines having a boiling point of less than about 100° C. Mineral acid amine salts which are suitable for use in formulating the salt compositions include, but are not limited to, the following: ammonium fluoride, ammonium chloride, ammonium bromide, ammonium iodide, monomethyl ammonium chloride, dimethyl ammonium chloride, trimethyl ammonium chloride, triethyl ammonium chloride, tributyl ammonium chloride, tributyl ammonium iodide, and combinations thereof. The preferred mineral acid amine salt is ammonium chloride.

The following examples are provided to illustrate further the present invention and are not to be construed as limiting the invention in any manner.

EXAMPLE 1

To a round-bottom flask equipped with agitator, thermometer, and reflux condenser, was charged 60.0 g of fatty acid imidazoline (which had been produced from the condensation of oleic acid and tetraethylene pentamine). The imidazoline was heated to 60° C., 30.0 g of a (5:1) mixture of diethylene glycol and triethanolamine was added to the flask, and a nitrogen sparge was applied. At a temperature in the range of 70–110° C., 100 g of concentrated hydrochloric acid were very slowly added to the flask. The neutralized fatty acid imidazoline was stirred under sparge (or vacuum) to remove the water, then 150 g of oleyl polypropylene diamine was subsequently added slowly to the flask with stirring. The product was allowed to cool to 60° C. and discharged. The resulting water-free mineral acid salt composition (hereinafter referred to as Composition No. 1) was free-flowing at 60° C.

EXAMPLE 2

To a round-bottom flask equipped with agitator, thermometer, and reflux condenser, was charged 90.0 g of fatty acid imidazoline (which had been produced from the condensation of oleic acid and tetraethylene pentamine). The imidazoline was heated to 60° C. and 16.0 g of triethanolamine was added to the flask. Subsequently, 24.0 g of ammonium chloride was added over a period of an hour with the application of a nitrogen sparge, and the process temperature was slowly raised to 120° C. The resulting reaction off-gas was collected in an acidic water trap. The neutralized or partially neutralized fatty acid imidazoline hydrochloride was stirred under sparge (or vacuum) to remove residual ammonia gas. The product was allowed to cool to 60° C. and discharged. The resulting water-free mineral acid salt composition (hereinafter referred to as Composition No. 2) was free-flowing at 60° C.

EXAMPLE 3

This example illustrates the utilization of the fluid water-free mineral acid salt compositions produced in Examples 1 and 2 as anti-stripping agents for hot asphalt applications. A charge of 1.0% by weight of Composition 1 (or Composition 2) was added to a vessel containing AC20 asphalt (commercially available from Citgo Corp.), and the resulting mixture was heated to 140° C. Concurrently, high-quartz river gravel aggregate was heated to 140° C. After about one hour, the asphalt mixture was stirred to homogenization. Subsequently, 4.5% (by weight of the aggregate) of the homogenized mixture was added to the hot aggregate, and the resulting asphalt/aggregate mixture was stirred to achieve uniform coating of the aggregate. The mix was allowed to cool to room temperature.

For evaluation purposes, a series of control asphalt mixes were produced wherein the water-free mineral acid salt composition was either omitted or replaced with an equal charge of: 1) C-18 fatty acid imidazoline (produced from the condensation of oleic acid and tetraethylene pentamine) or 2) C-18 oleyl fatty diamine.

To determine the efficiency of the anti-stripping additives the cured mixes were placed in a basket which was introduced into boiling water for ten minutes. After the basket was removed, the aggregate sample was placed in a shallow glass pan filled with cold water. The percent retained asphalt coat was judged visually by illuminating the surface of the coated stones with a 60 Watt lamp. The evaluation results are listed in Table 1 below.

TABLE I

Evaluation of Anti-Stripping Agents

| Anti-stripping Additive (One Percent)[1] | Adhesive Evaluation: Percent of Asphalt Film Retained on Aggregate[2] |
| --- | --- |
| Composition 1 | 100% |
| Composition 2 | 100% |
| Control 1 | 15% |
| Control 2 | 90% |
| Control 3 | 85% |

[1]Composition 1 = salt composition of Example 1. Composition 2 = salt composition of Example 2. Control 1 = no additive. Control 2 = C-18 fatty imidazoline. Control 3 = C-18 oleyl fatty diamine.
[2]Percent of asphalt film retained on aggregate after submersion for ten minutes in boiling water.

The results noted in Table I above show that the fluid water-free mineral acid compositions of the present invention are excellent anti-stripping agents for use in hot asphalt formulations.

EXAMPLE 4

A series of mineral acid salt compositions were produced by the following procedure. To a round-bottom flask equipped with agitator and thermometer, was added 120 parts by weight of fatty acid imidazoline (which had been derived from the condensation of oleic acid and tetraethylene pentamine). The imidazoline was heated to 60° C., and from 1–20 parts by weight of propylene glycol or triethanolamine was added to the flask. Subsequently, from 1–3 molar equivalents of gaseous hydrochloric acid was added subsurface via canula at a temperature of 60–120° C. The partially or fully neutralized imidazoline-based products were cooled to 60° C. and discharged. The resulting water-free mineral acid salt compositions were free-flowing at 60° C.

EXAMPLE 5

A series of mineral acid salt compositions were produced by the following procedure. To a round-bottom flask equipped with agitator, thermometer, and reflux condenser, was charged 60 parts by weight of fatty acid imidazoline (which had been produced from the condensation of oleic acid and tetraethylene pentamine). The imidazoline was heated to 60° C., 30 parts by weight of a (5:1) mixture of diethylene glycol and triethanolamine was added to the flask, and a nitrogen sparge was applied. At a temperature in the range of 70–110° C., from 50–200 parts by weight of concentrated hydrochloric acid were very slowly added to the flask. The neutralized fatty acid imidazoline was stirred under sparge (or vacuum) to remove the water. From 100–200 parts by weight of oleyl polypropylene diamine was subsequently added slowly to the flask with stirring. The products were allowed to cool to 60° C. and discharged. The resulting water-free mineral acid salt compositions were free-flowing at 60° C.

EXAMPLE 6

A series of mineral acid salt compositions were produced by the following procedure. To a round-bottom flask equipped with agitator, thermometer, and reflux condenser, was charged from 50–95 parts by weight of fatty acid imidazoline (which had been produced from the condensation of oleic acid and tetraethylene pentamine). The imidazoline was heated to 60° C. and from 1–20 parts by weight of propylene glycol or triethanolamine was added to the flask. Subsequently, from 5–50 parts by weight of ammonium chloride was added, a nitrogen sparge was applied, and the process temperature was slowly raised to 120° C. The resulting reaction off-gas was collected in an acidic water trap. The neutralized or partially neutralized fatty acid imidazoline hydrochloride was stirred under sparge (or vacuum) to remove residual ammonia gas. The products were allowed to cool to 60° C. and discharged. The resulting water-free mineral acid salt compositions were free-flowing at 60° C.

Many modifications and variations of the present invention will be apparent to one skilled in the art in light of the above teaching. It is understood therefore that the scope of the invention is not to be limited by the foregoing description, but rather is to be defined by the claims appended hereto.

What is claimed is:

1. A water-free fluid mineral acid salt composition of fatty acid amine derivatives for use in hot asphalt formulations comprising a blend of:
   a) about 25% to about 95% by total weight of the blend of a fatty acid amine derivative selected from the group consisting of amidoamines, imidazolines, polyamidoamines, amidoamine/imidoamines, polyimidazolines, and combinations thereof;
   b) about 4% to about 35% by total weight of the blend of a mineral acid, wherein said mineral acid is added to the blend at temperature and pressure adequate to eliminate water from the blend;
   c) about 1% to about 70% by total weight of the blend of a polar organic solvent having a boiling point higher than about 160° C., wherein said polar organic solvent is selected from the group consisting of polyalkanols, polyalkanolamines, polyalkanol ethers, polyalkanol esters, and combinations thereof; and
   d) up to about 70% by weight of the blend of a second fatty acid amine derivative having a different chemical structure than the fatty acid amine derivative (a), wherein said second fatty acid amine derivative is a member selected from the group consisting of fatty polypropylene polyamines, fatty ethoxylated polypropylene polyamines, fatty amidoamines, fatty imidazolines, fatty polyamidoamines, fatty amidoamine/imidoamines, fatty polyimidazolines, and combinations thereof.

2. The composition of claim 1 which further comprises a blend of:
   a) about 30% to about 90% by total weight of the blend of a fatty acid amine derivative selected from the group consisting of amidoamines, imidazolines, polyamidoamines, amidoamine/imidoamines, polyimidazolines, and combinations thereof;
   b) about 9% to about 35% by total weight of the blend of a mineral acid, wherein said mineral acid is added to the blend at temperature and pressure adequate to eliminate water from the blend;
   c) about 1% to about 60% by total weight of the blend of a polar organic solvent having a boiling point higher than about 160° C., wherein said polar organic solvent is selected from the group consisting of polyalkanols, polyalkanolamines, polyalkanol ethers, polyalkanol esters, and combinations thereof; and
   d) about 1% to about 60% by weight of the blend of a second fatty acid amine derivative having a different chemical structure than the fatty acid amine derivative (a), wherein said second fatty acid amine derivative is a member selected from the group consisting of fatty polypropylene polyamines, fatty ethoxylated polypropylene polyamines, fatty amidoamines, fatty imidazolines, fatty polyamidoamines, fatty amidoamine/imidoamines, fatty polyimidazolines, and combinations thereof.

3. The composition of claim 1 wherein the fatty acid amine derivative is the condensation reaction product of:
   a) a fatty acid having a chain length of at least 12 carbons, wherein said fatty acid is selected from the group consisting of unsaturated fatty acids, saturated fatty acids, dimerized fatty acids, modified fatty acids, and combinations thereof, and
   b) a member selected from the group consisting of polyethylene polyamines, polypropylene polyamines, polybutylene polyamines and higher homologs, and combinations thereof.

4. The composition of claim 3 wherein the unsaturated fatty acids and the saturated fatty acids have number average molecular weights in the range of about 190 to about 600.

5. The composition of claim 3 wherein the modified fatty acid is the Diels-Alder cyclo-adduct or ene-addition reaction product of:
   a) a member selected from the group consisting of unsaturated fatty acids, polyunsaturated fatty acids, and combinations thereof, and
   b) a member selected from the group consisting of acrylic acid, acrylic acid derivatives, fumaric acid, maleic anhydride, and combinations thereof.

6. The composition of claim 1 wherein the mineral acid is a member selected from the group consisting of hydrofluoric acid, hydrochloric acid, hydrobromic acid, hydroiodic acid, sulfuric acid, phosphoric acid, and combinations thereof.

7. A water-free mineral acid salt composition of fatty acid amine derivatives for use in hot asphalt formulations comprising a blend of:
   a) about 25% to about 95% by total weight of the reactants of a fatty acid amine derivative selected from the group consisting of amidoamines, imidazolines, polyamidoamines, amidoamine/imidoamines, polyimidazolines, and combinations thereof;
   b) about 4% to about 45% by total weight of the reactants of a mineral acid amine salt derived from a low-boiling fugitive amine, wherein said mineral acid amine salt is added to the blend at temperature and pressure adequate to eliminate the fugitive amine from the blend; and
   c) about 1% to about 70% by total weight of the blend of a polar organic solvent having a boiling point higher than about 160° C., wherein said polar organic solvent is selected from the group consisting of polyalkanols, polyalkanolamines, polyalkanol ethers, polyalkanol esters, and combinations thereof; and
   d) up to about 70% by weight of the blend of a second fatty acid amine derivative having a different chemical structure than the fatty acid amine derivative (a), wherein said second fatty acid amine derivative is a member selected from the group consisting of fatty polypropylene polyamines, fatty ethoxylated polypropylene polyamines, fatty amidoamines, fatty imidazolines, fatty polyamidoamines, fatty amidoamine/imidoamines, fatty polyimidazolines, and combinations thereof.

8. The composition of claim 7 which further comprises a blend of:
   a) about 30% to about 90% by total weight of the reactants of a fatty acid amine derivative selected from the group consisting of amidoamines, imidazolines, polyamidoamines, amidoamine/imidoamines, polyimidazolines, and combinations thereof;
   b) about 9% to about 40% by total weight of the reactants of a mineral acid amine salt derived from a low-boiling fugitive amine, wherein said mineral acid amine salt is added to the blend at temperature and pressure adequate to eliminate the fugitive amine from the blend; and
   c) about 1% to about 60% by total weight of the blend of a polar organic solvent having a boiling point higher than about 160° C., wherein said polar organic solvent is selected from the group consisting of polyalkanols, polyalkanolamines, polyalkanol ethers, polyalkanol esters, and combinations thereof; and
   d) about 1% to about 60% by weight of the blend of a second fatty acid amine derivative having a different chemical structure than the fatty acid amine derivative (a), wherein said second fatty acid amine derivative is a member selected from the group consisting of fatty polypropylene polyamines, fatty ethoxylated polypropylene polyamines, fatty amidoamines, fatty imidazolines, fatty polyamidoamines, fatty amidoamine/imidoamines, fatty polyimidazolines, and combinations thereof.

9. The composition of claim 7 wherein the fatty acid amine derivative is the condensation reaction product of:
   a) a fatty acid having a chain length of at least 12 carbons, wherein said fatty acid is selected from the group consisting of unsaturated fatty acids, saturated fatty acids, dimerized fatty acids, modified fatty acids, and combinations thereof; and
   b) a member selected from the group consisting of polyethylene polyamines, polypropylene polyamines, polybutylene polyamines and higher homologs, and combinations thereof.

10. The composition of claim 9 wherein the unsaturated fatty acids and the saturated fatty acids have number average molecular weights in the range of about 190 to about 600.

11. The composition of claim 9 wherein the modified fatty acid is the Diels-Alder cyclo-adduct or ene-addition reaction product of:
   a) a member selected from the group consisting of unsaturated fatty acids, polyunsaturated fatty acids, and combinations thereof, and
   b) a member selected from the group consisting of acrylic acid, acrylic acid derivatives, fumaric acid, maleic anhydride, and combinations thereof.

12. The composition of claim 7 wherein the mineral acid amine salt is a member selected from the group consisting of ammonium fluoride, ammonium chloride, ammonium bromide, ammonium iodide, monomethyl ammonium chloride, dimethyl ammonium chloride, trimethyl ammonium chloride, triethyl ammonium chloride, tributyl ammonium chloride, tributyl ammonium iodide, and combinations thereof.

* * * * *